(12) United States Patent
Lecomte et al.

(10) Patent No.: US 6,793,714 B2
(45) Date of Patent: Sep. 21, 2004

(54) PROCESS FOR DEHYDRATING AND STRIPPING A WET NATURAL GAS

(75) Inventors: Fabrice Lecomte, Rueil Malmaison (FR); Béatrice Fischer, Lyons (FR); Jean-Charles Viltard, Vienne (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 150 days.

(21) Appl. No.: 10/108,494

(22) Filed: Mar. 29, 2002

(65) Prior Publication Data

US 2002/0178918 A1 Dec. 5, 2002

(30) Foreign Application Priority Data

Mar. 29, 2001 (FR) .............................. 01 04299

(51) Int. Cl.[7] .............................................. B01D 53/14
(52) U.S. Cl. .......................... 95/174; 95/179; 95/180; 95/193; 95/231; 95/209
(58) Field of Search ........................ 95/161, 163, 165, 95/166, 167, 173, 174, 178, 179, 180, 193, 194, 231, 209

(56) References Cited

U.S. PATENT DOCUMENTS

| | | | |
|---|---|---|---|
| 3,633,338 A | * | 1/1972 | Zahn |
| 4,529,413 A | | 7/1985 | Ferguson |
| 4,775,395 A | * | 10/1988 | Rojey et al. |
| 4,979,966 A | * | 12/1990 | Rojey et al. |
| 4,999,031 A | * | 3/1991 | Gerhardt et al. |
| 5,167,675 A | * | 12/1992 | Rhodes |
| 5,782,958 A | * | 7/1998 | Rojey et al. |
| 5,797,981 A | * | 8/1998 | Collin et al. |
| 5,907,924 A | * | 6/1999 | Collin et al. |
| 6,001,153 A | * | 12/1999 | Lebas et al. |
| 6,004,380 A | * | 12/1999 | Landreau et al. |
| 6,461,413 B1 | * | 10/2002 | Landreau et al. |
| 2002/0059865 A1 | * | 5/2002 | Lemaire et al. |
| 2002/0062735 A1 | * | 5/2002 | Lecomte et al. |
| 2002/0178918 A1 | * | 12/2002 | Lecomte et al. |
| 2002/0185006 A1 | * | 12/2002 | Lecomte et al. |

FOREIGN PATENT DOCUMENTS

| | | |
|---|---|---|
| EP | 0362023 | 4/1990 |
| FR | 2605241 | 4/1988 |
| FR | 2787870 | 6/2000 |

\* cited by examiner

*Primary Examiner*—Duane S. Smith
(74) *Attorney, Agent, or Firm*—Antonelli, Terry, Stout & Kraus, LLP

(57) ABSTRACT

In a process for dehydration/fractionation of a wet natural gas containing heavy constituents and light constituents, In the presence of methanol, aqueous liquid phases are combined and the resultant combined aqueous liquid phase contacted with the first part of the gas to be scrubbed, which carries along the major part of the methanol, which allows to collect practically pure water. Before this step, all or part of one or both of the aqueous liquid phases and/or all or part of the aqueous liquid phase from a washing zone is sent to a distillation stage where practically pure methanol is collected at the top and a methanol-depleted aqueous liquid phase is collected at the bottom prior to being sent back to the first stage or used for the washing stage.

17 Claims, 4 Drawing Sheets

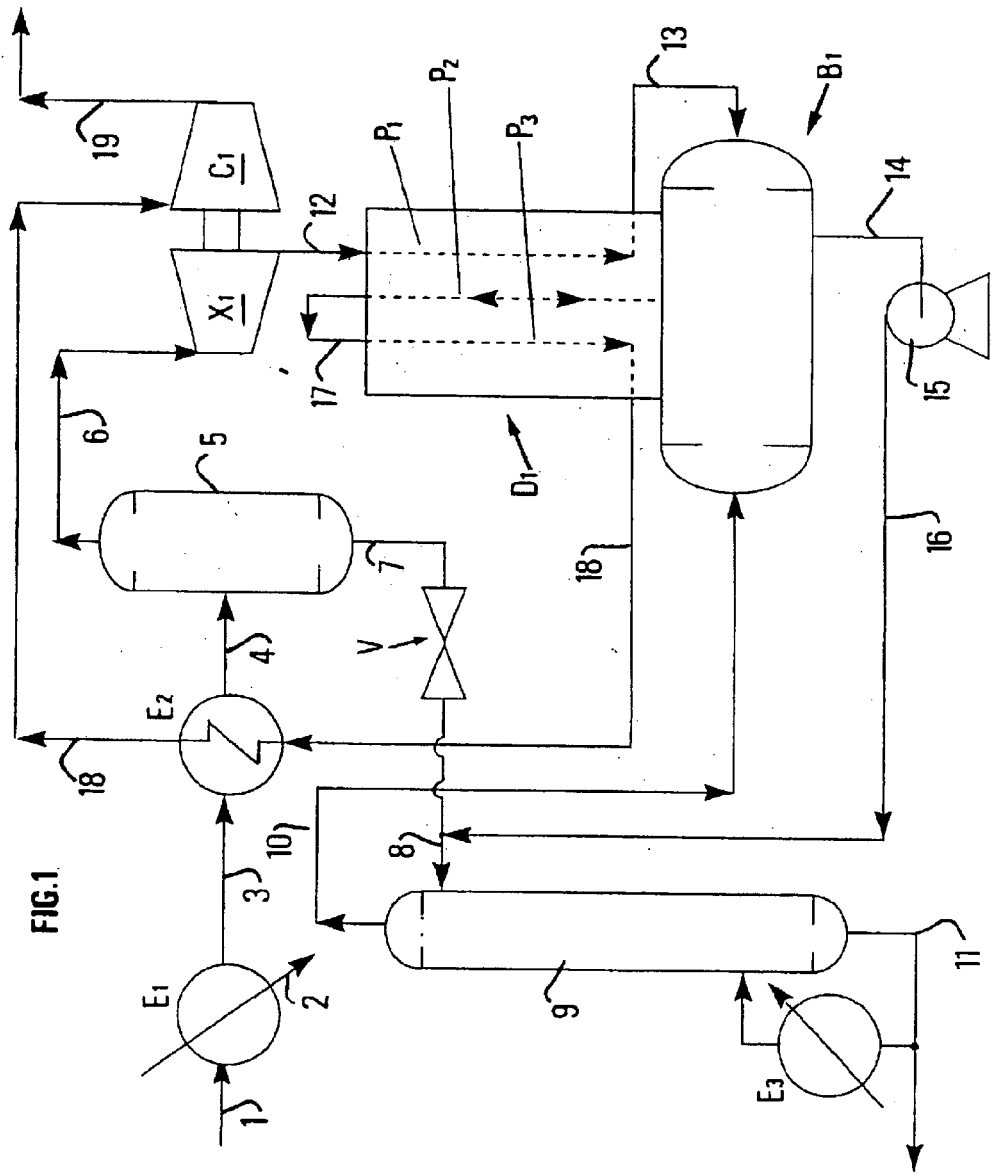
FIG.1 (BACKGROUND)

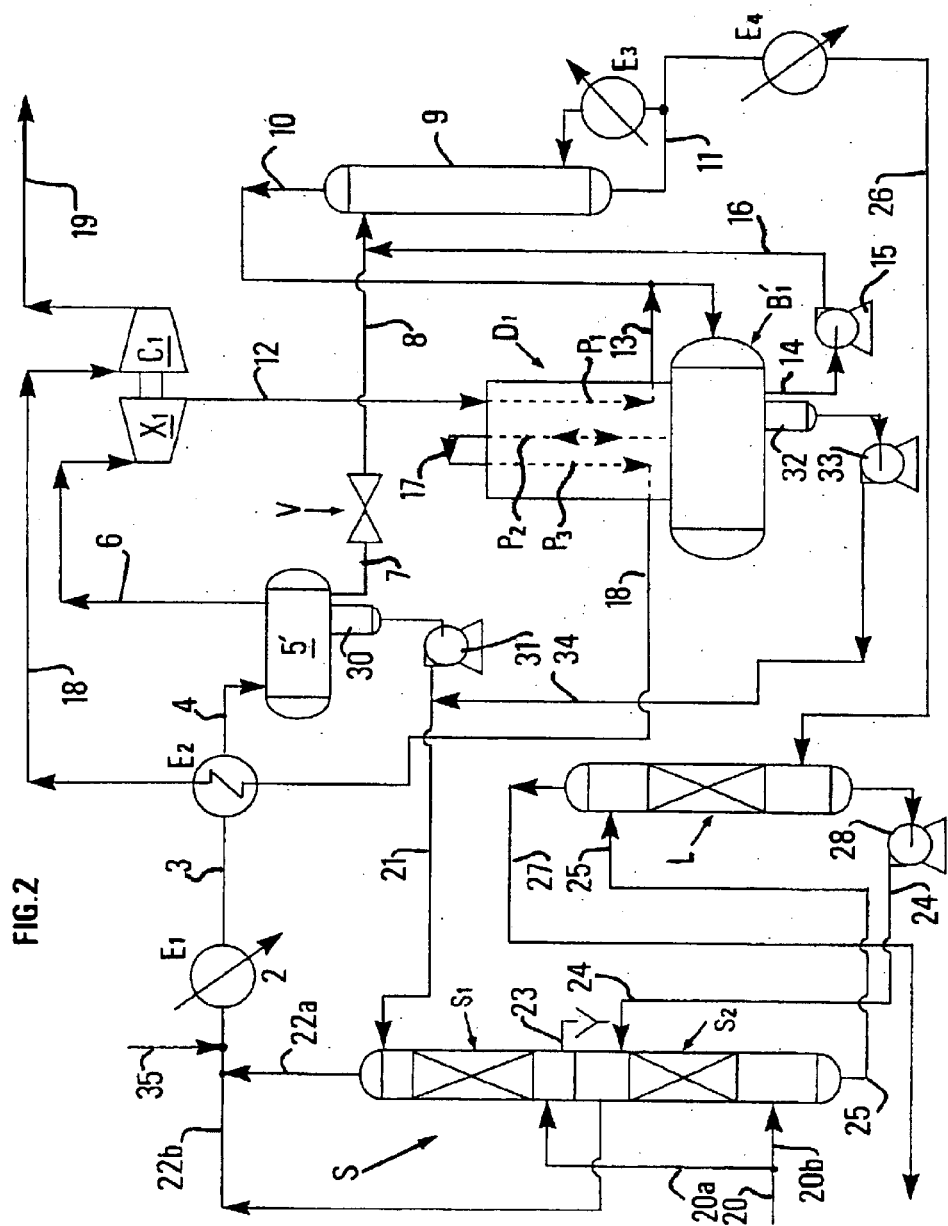
FIG.2 (BACKGROUND)

PROCESS FOR DEHYDRATING AND STRIPPING A WET NATURAL GAS

FIELD OF THE INVENTION

The present invention relates to an improved process for dehydrating and fractionating a high-pressure wet natural gas.

BACKGROUND OF THE INVENTION

In French patent FR-B-2,787,870, the applicant has described a process allowing to fractionate a high-pressure natural gas (for example above 5 MPa) containing hydrocarbon constituents referred to as <<heavy>> constituents, consisting of hydrocarbons having at least 3 carbon atoms, and constituents referred to as <<light>> constituents, essentially consisting of methane and ethane.

This process comprised in combination at least the following stages:
1) cooling the gas from $T_0$ to a temperature $T_1$,
2) separating gas phase G1 from liquid phase L1 obtained during cooling stage (1),
3) sending at least part of gas phase G1 from separation stage (2) to an expansion stage (X1) so as to obtain a mixed phase M2 at a temperature $T_2$ and a pressure $P_2$,
4) sending mixed phase M2 to a stage of fractionation by heat exchange (7) wherein it serves as a cooling agent, after which it is heated,
5) sending liquid phase L1 to an expansion stage (V),
6) sending heated mixed phase M2 and expanded liquid phase L1 to a separation stage so as to obtain a gas phase and a liquid phase, and
7) fractionating the gas phase by distillation carried out by means of continuous heat exchange with mixed phase M2 and extracting the <<light>> constituents in form of gas and the <<heavy>> constituents in form of condensates, fractionating stage (7) being carried out after expansion stage (3) producing mixed phase M2.

Liquid phase L1 expanded during stage (5) can be sent to a stabilization stage in order to obtain stabilized condensates and a gas phase G3 to be fractionated, sent to separation stage (6).

It is also possible to use at least part of the scrubbed gas from fractionating stage (7) as an additional cooling agent for this stage.

It is also possible to use at least part of the scrubbed gas to cool the gas during cooling stage (1).

The process according to the prior document is described hereafter in connection with FIG. 1.

The natural gas to be fractionated is sent at high pressure $P_0$ and at a temperature $T_0$ through line 1 into a heat exchanger E1. Inside E1, it is cooled by heat exchange with cooling water circulating in line 2 or sea water, or air. The cooled gas sent through line 3 is then cooled in a second heat exchanger E2 to a temperature $T_1$. Heat exchange is for example performed by means of at least part of the scrubbed gas from the fractionating and purification process, circulating through line 18.

The cooled mixed phase comprising a gas phase and condensates from exchanger E2 is fed through a line 4 into a separation device, a separating drum 5 for example. In this separating drum, the condensates are separated, a gas phase G1 is extracted at the top of the drum through a line 6 and the separated condensates or L1 are extracted at the bottom of the drum through a line 7.

Gas phase G1 is sent to an expansion device such as an expander X1 so as to obtain a mainly gaseous mixed phase M2 cooled by expansion to a temperature $T_2$. This cooled mixed phase M2 is used as a cooling agent during the fractionating and purification stage carried out in exchanger-dephlegmator D1 described hereafter.

Liquid phase L1 consisting of the condensed $C_3^+$ and of part of the $C_1$ and $C_2$ is expanded for example through an expansion valve V. Two-phase fluid M3 resulting from this expansion is for example sent through a line 8 in a stabilization column 9. A gas phase G3 is discharged at the top of stabilization column 9, through a line 10, and the stabilized condensates L3 are discharged at the bottom through a line 11.

The stabilization column is for example reboiled by means of a hot-oil exchanger E3. The $C_3^+$ mixture at the bottom of the column only contains a small amount of light products ($C_1$ and $C_2$).

The fractionating and purification system described in the prior document comprises an assembly consisting of at least one dephlegmator D1 associated with a separating drum B1. Dephlegmator D1 is for example a plate exchanger known to the man skilled in the art, which comprises passages whose size and geometry are suited for circulation of the liquid and gas phases; these passages are referred to as <<passes>> within the scope of this application. Dephlegmator D1 comprises at least two passes, one pass P1 suited for circulation of a fluid, for example mainly gaseous mixed phase M2 from expander X1, serving as a cooling agent, and a pass P2 or <<reflux pass>> in which the gas to be fractionated circulates upwards. As a result of cooling through thermal exchange with mixed phase M2, a condensation occurs in reflux pass P2 as the condensed liquid causes a distillation effect while flowing down. The exchanger-dephlegmator can also comprise a third pass P3 and possibly other passes.

Mixed phase M2 from expander X1 is sent through a line 12 into first pass P1 of the dephlegmator where it circulates with a descending flow as shown by the dotted line in FIG. 1. After acting as a cooling agent, this mixed phase, heated to a temperature $T_3$ in relation to its inlet temperature $T_2$ and depleted in liquid, is extracted through a line 13.

This mixed phase and gas phase G3 extracted from stabilization column 9 through line 10 are fed and mixed together in separating drum B1. The gas phase and the liquid phase separate inside separating drum B1.

The condensates (or liquid phase) separated in drum B1 are extracted through a line 14 and sent by a pump 15 and through a line 16 to be mixed with two-phase mixture M3 from expansion valve V. These condensates partly consist of the liquid of the mixture separated in B1, and of the liquid condensed in the reflux pass.

The gas phase obtained by separation in separating drum B1 is at the dew point. It circulates in an ascending flow in reflux pass P2 and cools down as it flows therethrough. In this pass P2, the liquid condensed by heat exchange with mixed phase M2 circulating in a descending flow in pass P1 circulates with a descending flow and causes a distillation effect. A scrubbed gas is thus obtained, which is discharged through a line 17 at the top of exchanger-dephlegmator D1. The scrubbed gas is at a temperature $T_4$ close to $T_2$ (temperature of mixed phase M2 at the expander outlet). This scrubbed gas has in most cases lost between 90 and 99% of the propane present in the feed introduced through line 1.

Scrubbed gas G4 extracted through line 17 is for example re-introduced into a third pass P3 of dephlegmator D1 to be used as a second cold source. It circulates with a descending flow in P3, cocurrent to the circulation of mixed phase M2 and countercurrent to the direction of circulation of the gas phase separated in the dephlegmator drum. At the outlet of this third pass P3, a scrubbed and heated gas flow G5 (temperature $T_3$) is for example recycled through a line 18 to heat exchanger E2. The gas, after being used as cooling agent and therefore heated in heat exchanger E2, is sent to a compressor C1 prior to being exported through a line 19. Compressor C1 is for example driven by expander X1.

Document FR-B-2,787,870 also described a process wherein a wet natural gas (that had not been subjected to a previous drying treatment) was treated, this process using methanol to prevent hydrate formation between the water and the gas during cooling thereof.

During cooling of the gas, a liquid phase containing water and methanol was thus collected besides a hydrocarbon liquid phase consisting of the condensates, i.e. $C_3^+$ hydrocarbons or NGL.

The process then comprised in combination at least the following stages:

(a) a first part of the gas to be scrubbed is contacted with aqueous liquid phase L' comprising aqueous liquid phases L'1 and L'2 containing methanol and coming from stages (c) and (g) respectively, the second part of the gas is contacted with a methanol-containing aqueous liquid phase L'3 from condensate washing stage (j), and the two parts of the gas are combined, (b) the gas is cooled, (c) a gas phase G1, a hydrocarbon liquid phase L1 and a methanol-containing aqueous liquid phase L'1 obtained during stage (b) are separated, (d) at least part of gas phase G1 from separation stage (c) is sent to an expansion stage (X1) so as to obtain a mixed phase M2, (e) mixed phase M2 is sent to a heat exchange stage (h) wherein it serves as a cooling agent, after which it is heated, (f) hydrocarbon liquid phase L1 is sent to an expansion stage (V), (g) heated mixed phase M2 and expanded liquid phase L1 are sent to a separation stage so as to obtain a gas phase G2, a hydrocarbon liquid phase L2 and a methanol-containing aqueous liquid phase L'2, (h) gas phase G2 is fractionated by distillation carried out by continuous heat exchange with mixed phase M2 and the <<light>> constituents are extracted in form of a gas, which is exported, while the <<heavy>> constituents are extracted as condensates which are added to phase L2, fractionating stage (h) being carried out after expansion stage (d), (i) aqueous liquid phases L'1 and L'2 are combined into an aqueous liquid phase L' which is contacted with the first part of the gas to be scrubbed, which carries along the most part of the methanol, which allows practically pure water to be collected, and (j) hydrocarbon liquid phase L2 is sent to a washing stage (column L) performed in contact with a methanol-containing aqueous liquid phase obtained from contacting with the second part of the gas to be scrubbed in stage (a).

This embodiment is reminded hereafter in connection with FIG. 2 wherein the elements and devices of the system identical to those of FIG. 1 have the same reference numbers.

In relation to the layout described in FIG. 1, the embodiment shown in FIG. 2 uses a column S comprising two parts, one (for example upper part S1) which allows the gas to strip the methanol of the liquid phase containing water and methanol, obtained upon cooling of the gas prior to expansion, the other (for example lower part S2) which allows to regenerate the wash water used in a NGL (or condensate) wash column L.

In this embodiment of the process according to the invention, part of the gas flowing in through line 20 is sent through a line 20a to upper part S1 of column S. A methanol-containing liquid phase is injected at the top of upper part S1 through a line 21. A methanol-enriched gas is extracted at the top of column S through a line 22a, and a water greatly depleted in methanol is extracted through a line 23 in the middle of the column (at the bottom of upper part S1).

Another part of the gas is fed through a line 20b into lower part S2 of the column to regenerate the wash water from NGL wash column L described hereafter. The wash water is introduced at the top of lower part S2 through a line 24 coming from wash column L. Methanol-enriched gas is extracted at the top of part S2 of the column through a line 22b and methanol-depleted wash water is extracted at the bottom of column S through a line 25 prior to being sent to the NGL wash column.

Stripping of the wash water used to wash the NGL in wash column L is thus performed in lower part S2 of the column.

Wash column L allows to clear the natural gas liquid of the methanol it contains to prevent methanol losses. The natural gas liquid concerned (condensates) comes from stabilization column 9 through line 11. This stream flows through a heat exchanger E4 arranged after heat exchanger E3 (reboiler) prior to being fed into the lower part of wash column L through a line 26. In wash column L, the NGL is washed by means of the methanol-depleted water introduced through line 25 at the top of the column. The methanol-freed NGL is recovered through a line 27 at the top of column L and the methanol-containing wash water is collected at the bottom of the column, sent through line 24 and a pump 28 to be stripped in lower part S2 of column S.

The methanol-enriched gas obtained from the union of lines 22a and 22b is cooled on the same pattern as in FIG. 1, through the two heat exchangers E1 and E2. It is cooled to a temperature below −15° C., then sent to a separation stage carried out in a separating drum 5' provided with a <<boot>> 30 allowing a water+methanol liquid phase to be recovered.

The water+methanol liquid phase separated and extracted from drum 5' is sent through a pump 31 and line 21 to the top of stripping column S to be freed of the methanol it contains.

The condensates separated in drum 5' are sent to the stabilization column as shown in FIG. 1 (line 7, expansion valve V and line 8).

The gas separated in separating drum 5' and extracted through line 6 is expanded through an expander X1, where it is expanded to a pressure below 2 MPa. The expanded mixture still comprises traces of water and methanol.

Upon cooling, a water-methanol phase will decant in separating drum B'1 of the dephlegmator. This drum is provided with a boot 32 allowing to recover this water-methanol phase which is sent through a pump 33 and a line 34 to supply line 21 intended for delivery of the water-methanol phase in column S. The separated condensates are sent to stabilization column 9 (line 14, pump 15 and line 16).

BRIEF DESCRIPTION OF THE DRAWING

FIG. 1 shows a background embodiment of the present invention.

FIG. 2 shows a background embodiment of the present invention.

Extra methanol is injected for example before exchanger E1 through a line 35.

If necessary, an additional amount of methanol can be introduced at the level of expander X1 and/or at the inlet provided for mixed phase M2 in the dephlegmator.

In some cases, one may be led to inject methanol in amounts that are greater than the amounts that can be discharged with the outgoing effluents of the process (i.e. the scrubbed gas and the condensates). This leads to an accumulation of methanol in the aqueous liquid phase at the bottom of the cold section, in practice at the bottom of separating drum 5' or at the bottom of separating drum B'1 of FIG. 2, or to an accumulation of methanol in the aqueous phase collected at the bottom of liquid hydrocarbon wash column L. It is then advantageous to carry out an additional methanol recovery stage.

SUMMARY OF THE INVENTION

The improved process according to the invention is defined in the same way as the prior dehydration and fractionating process, but it is characterized in that at least a methanol-containing aqueous liquid phase produced in the process is sent to a distillation stage (k) wherein practically pure methanol is collected at the top and a methanol-depleted aqueous liquid phase is collected at the bottom and re-used at another point of the process.

DETAILED DESCRIPTION

The process of the invention covers more particularly three cases.

In the first case, before stage (i), all or part of methanol-containing aqueous liquid phase L'1 separated in stage (c) is sent no longer to stage (a) at the top of upper part S1 of stripping column S (to be contacted with the first fraction of the wet natural gas to be treated), but to a distillation stage (k) wherein practically pure methanol (95–99% by mole) is separated at the top and possibly sent to a storage point, and a methanol-depleted aqueous liquid phase L'4 is separated at the bottom. This aqueous liquid phase L'4 is in this case sent back to stage (a) after being cooled. It can also be used to wash the liquid hydrocarbons in stage (j).

Figure 3A:
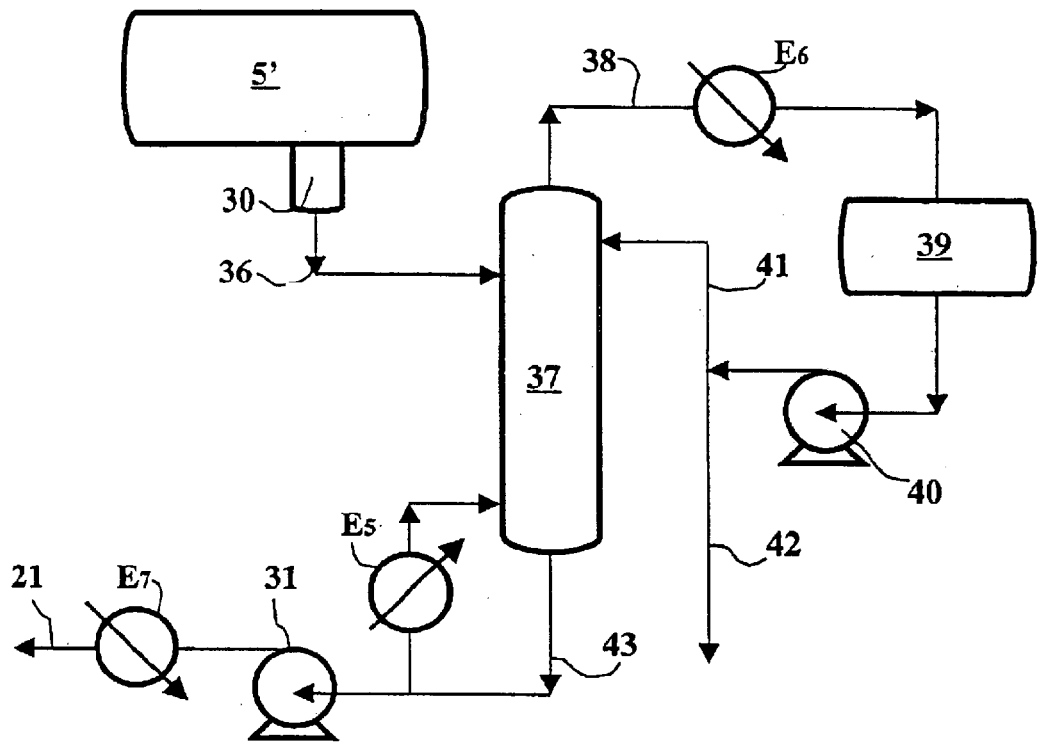
FIGS. 3a–3c show embodiments of the present invention.

If we refer to FIG. 3a, the aqueous liquid phase containing excess methanol and coming from bottom 30 of separating drum 5' is fed through line 36 into distillation column 37, reboiled for example by means of an exchanger E5.

The top vapour of column 37, flowing out through line 38, consists of methanol of high purity, for example 95–97% by mole. It is condensed in exchanger E6 and the resulting liquid phase is collected in drum 39. This liquid phase is partly sent through pump 40 and through line 41 to the top of column 37 as liquid reflux. The other part is sent through line 42 to a methanol storage point so as to be used later in this process or in any other independent process.

A liquid phase is recovered at the bottom of distillation column 37, which consists of a methanol-depleted water+methanol mixture sent through line 43, pump 31 and line 21 (with cooling in heat exchanger E7) to the top of upper part S1 of stripping column S as described above.

In the second case, all or part of methanol-containing aqueous liquid phase L'2 from stage (g) (i.e. from separating drum B'1) is sent no longer to stage (a) at the top of upper part S1 of stripping column S (to be contacted with the first fraction of the wet natural gas to be treated), but to a distillation stage (k) wherein practically pure methanol (95–99% by mole) is separated at the top and possibly sent to a storage point, and a methanol-depleted aqueous liquid phase L'5 is collected at the bottom This aqueous liquid phase L'5 is in this case sent back to stage (a) after being cooled. It can also be used to wash the liquid hydrocarbons in stage (j).

Figure 3B:
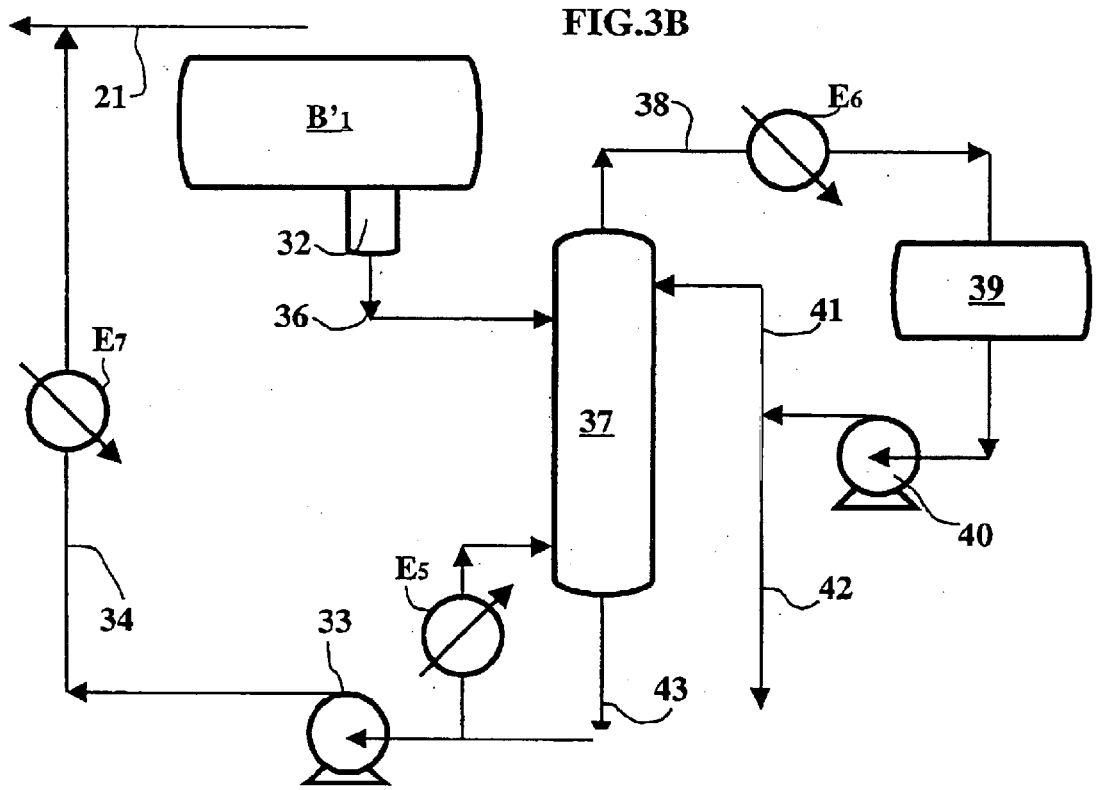

If we refer to FIG. 3b, the aqueous liquid phase containing excess methanol and coming from bottom 32 of separating drum B'1 is fed through line 36 into distillation column 37, reboiled for example by means of an exchanger E5.

The top vapour of column 37, flowing out through line 38, consists of methanol of high purity, for example 95–97% by mole. It is condensed in exchanger E6 and the resulting liquid phase is recovered in drum 39. This liquid phase is partly sent by pump 40 through line 41 to the top of column 37 as liquid reflux. The other part is sent through line 42 to a methanol storage point to be re-used later, in this process or in any other independent process.

A liquid phase is collected at the bottom of distillation column 37, which consists of a methanol-depleted water+methanol mixture sent through line 43, pump 33 and line 34 (with cooling in a heat exchanger E7) to line 21 supplying the top of upper part S1 of stripping column S, as described above.

In the third case, all or part of the methanol-containing aqueous liquid phase recovered at the bottom of liquid hydrocarbon wash column L is sent no longer to stage (a) at the top of lower part S2 of stripping column S (to be contacted with the second fraction of the wet natural gas to be treated), but to a distillation stage (k) wherein practically pure methanol (95–99% by mole) is separated at the top and possibly sent to a storage point, and a methanol-depleted aqueous liquid phase L'6 is collected at the bottom. This aqueous liquid phase L'6 is in this case recycled to the top of liquid hydrocarbon wash column L after being cooled.

Figure 3C:
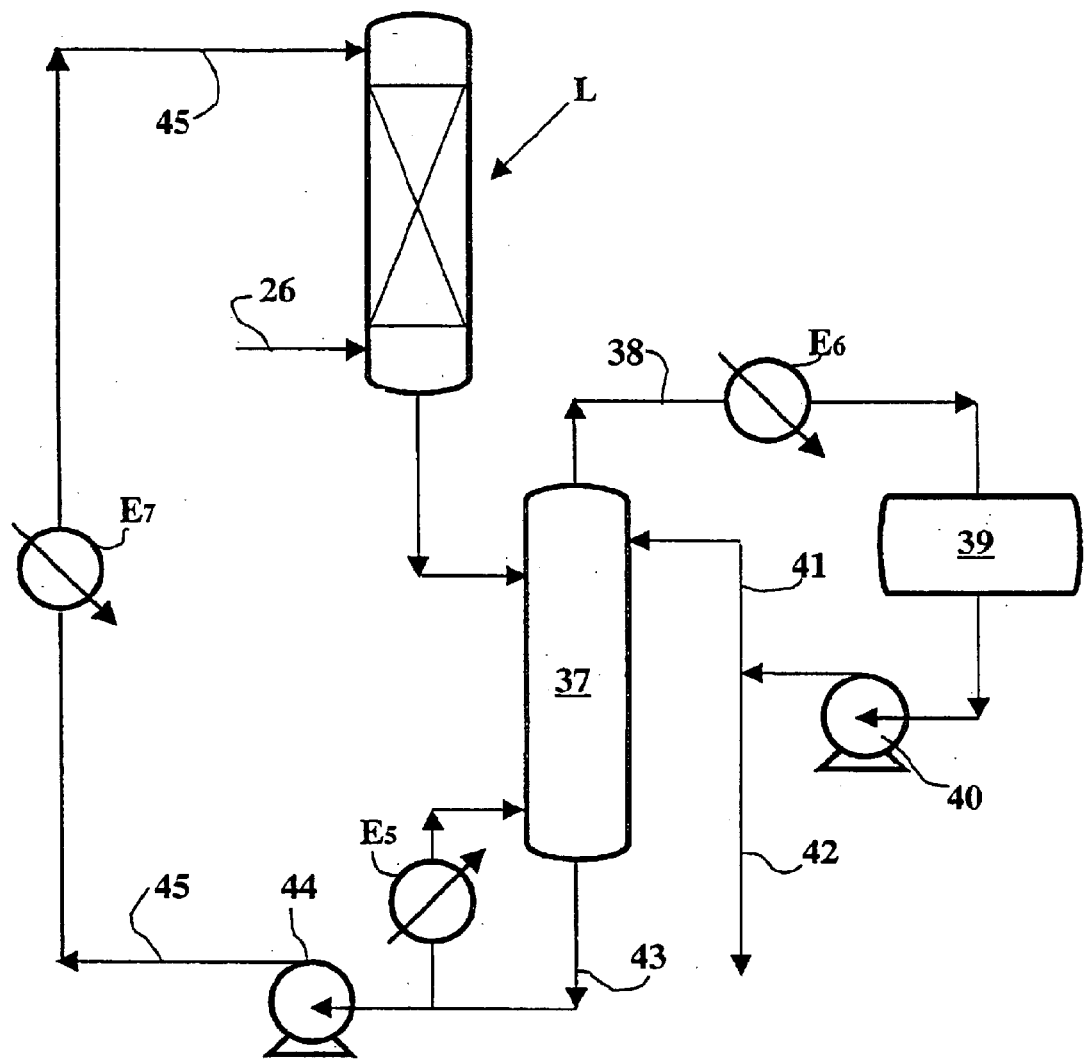

If we refer to FIG. 3c, the aqueous liquid phase containing excess methanol and coming from the bottom of liquid hydrocarbon wash column L is fed through line 36 into distillation column 37, reboiled for example by means of an exchanger E5.

The top vapour of column 37, flowing out through line 38, consists of methanol of high purity, for example 95–97% by mole. It is condensed in exchanger E6 and the resulting liquid phase is collected in drum 39. This liquid phase is partly sent through pump 40 and through line 41 to the top of column 37 as liquid reflux. The other part is sent through line 42 to a methanol storage point so as to be re-used later, in this process or in any other independent process.

A liquid phase consisting of a methanol-depleted water+methanol mixture is recovered at the bottom of distillation column 37 and sent through line 43, pump 44 and line 45 (with cooling in a heat exchanger E7) directly to the top of liquid hydrocarbon wash column L.

The example given hereafter illustrates the implementation of the process according to the invention without limiting the scope thereof.

EXAMPLE

The natural gas is introduced at a temperature of 50° C. and a pressure of 7.5 MPa. Its flow rate is 11386 kmol/h.

Its composition, given in percent by volume, is as follows:

| | |
|---|---|
| $CO_2$ | 1.58% |
| Methane | 79.54% |
| Ethane | 9.95% |
| Propane | 4.91% |
| Butanes | 2.39% |
| $C_5^+$ hydrocarbons | 1.42% |
| Water | 0.21%. |

A first fraction of the gas (3416 kmol/h) is sent to the foot of lower section S2 of a stripping column S wherein it flows countercurrent to a methanol-containing (24.6% by mole) liquid phase coming from liquid hydrocarbon wash column L (36 kmol/h). This first gas fraction having carried along part of the methanol flows out of section S2 with a methanol concentration of 0.26% by mole (3424 kmol/h). The methanol-depleted liquid phase (28 kmol/h with 0.06% by mole of methanol) is sent back to wash column L.

The rest of the gas (7970 kmol/h) is sent to the foot of upper section S1 of stripping column S, wherein it flows countercurrent to a methanol-containing (54.3% by mole) liquid phase described hereafter. Practically pure water is collected at the bottom of this section S1. The gas fraction having carried along the methanol flows out of section S1 with a methanol concentration of 0.30% by mole and a flow rate of 7992 kmol/h. It receives extra methanol (0.96 kmol/h) through line 35.

The two combined gas fractions are sent to exchanger E1 wherein the gas is cooled with cooling water to a temperature of 35° C. It is then cooled in exchanger E2 by heat exchange with scrubbed gas G5 from exchanger-dephlegmator D1 to a temperature of 10° C. This cooling operation is completed by exchange with a refrigerant so as to reach a temperature of −27° C. During cooling, partial condensation occurs, which produces two liquid phases, a methanol-containing aqueous liquid phase L'1 (54.2% by mole of methanol) and a hydrocarbon-containing liquid phase L1 (2722 kmol/h), as well as a vapour phase G2 (8650 kmol/h). These three phases are separated in separating drum 5'.

Aqueous liquid phase L'1 extracted from separating drum 5' through <<boot>> 30 (44.5 kmol/h) is sent to the top of section S1 of stripping column S to be freed of the methanol it contains by stripping with the second fraction of the gas to be treated. The methanol-enriched gas (0.30% by mole) flows out at the top of S1 (7992 kmol/h).

Hydrocarbon liquid phase L1 extracted from separating drum 5' through line 7 (2722 kmol/h) is expanded through expansion valve V to a pressure of 2.6 MPa prior to being fed into stabilization column 9 comprising 8 theoretical plates, reboiled by means of exchanger E3 so that the temperature at the bottom of the column is 95° C. Vapour phase G3 extracted at the top of the stabilization column (2441 kmol/h) is sent to the separating drum of the dephlegmator. It is at a temperature of 0° C.

Gas phase G2 (the partly stripped and dehydrated gas) from separating drum 5', at a pressure of 7.6 MPa and a temperature of −27° C. (8650 kmol/h), is sent to expander X1. After passing through the expander, its pressure is 2.7 MPa and its temperature −68° C. At the level of the expander, methanol is injected at a flow rate of 3.5 kmol/h (112 kg/h).

During expansion, partial condensation occurs, leading to a mixture M2 consisting of a gas phase, an aqueous phase and condensates. This mixture is sent into first pass P1 of dephlegmator D1 to serve as a cooling fluid. At the outlet of this first pass, the heated mixture (−46° C.) extracted through line 13 is fed into separating drum B'1 of the dephlegmator with the gas phase from the top of stabilization column 9, where the gas phase, the aqueous phase and the condensates are separated.

The condensates or hydrocarbon liquid phase (739 kmol/h) are extracted through line 14 and pump 15, and sent to stabilization column 9 with the liquid hydrocarbons from separating drum 5'.

The aqueous liquid phase collected in <<boot>> 32 of separating drum B'1 (less than 1 kmol/h) has a methanol concentration of 81.5% by mole. It is mixed with effluent L'1 from separating drum 5' and sent to the top of section S1. The gas phase separated in drum B'1 circulates with an ascending flow in second pass P2 of dephlegmator D1.

All the gas phases obtained after the separation performed in separating drum B'1 are at dew point at the inlet of pass P2 where the distillation is carried out. After this distillation, a gas stream G4 is extracted through line 17. This gas G4 is cleared of the most part of the propane it contains and it is at a temperature of −66° C. (residual propane content: 0.1% by mole). 6.5 kmol/h of methanol is injected at the top of pass P2 to prevent hydrate formation in the exchanger-dephlegmator.

Gas stream G4 is sent into third pass P3 of the dephlegmator and serves as a secondary cold source. The gas stream G5 flowing out at a temperature of −46° C. is sent through line 18 to serve as a cooling agent in exchanger E2. After heat exchange, the scrubbed gas heated to a temperature of 25° C. is sent to compressor C1 driven by expander X1. The scrubbed gas flowing from C1 through line 19 is at a pressure of 3.2 MPa and at a temperature of 44° C.

The liquid at the bottom of stabilization column 9 (methanol concentration: 1.9% by mole) is sent (1020 kmol/h) to wash column L where it is brought into countercurrent contact with the methanol-depleted liquid phase coming from lower section S2 of stripping column S (28 kmol/h) and with the aqueous phase collected at the bottom of column 37 (31 kmol/h).

The condensates freed of most of the methanol (residual content: less than 0.1% by mole) are finally discharged at the top of wash column L (1001 kmol/h). They contain 98% of the propane of the feed and all of the heavier hydrocarbons and butanes. A small amount of ethane is present, however limited so that the $C_3$ and $C_4$ that can be distilled from the exported liquid have a vapour pressure in accordance with the commercial requirements.

The condensate wash water flowing from the bottom of wash column L contains 25% by mole of methanol. A part (41 kmol/h) is sent to water/methanol separation column 37 where the bottom temperature is 119° C. and the top temperature is 81° C. The pressure is 0.2 MPa. The column comprises 15 theoretical plates. A vapour phase (10 kmol/h) containing more than 99% by mole of methanol and less than 1% by mole of water is obtained at the top. This vapour is condensed to a liquid sent to a storage point prior to being re-injected at the cold points of the process. The effluent at the bottom of the column (31 kmol/h) is a water/methanol mixture whose water concentration is above 99% by mole. This effluent is combined with the liquid collected at the bottom of stripping column S2 (28 kmol/h). This stream (59 kmol/h), with a methanol concentration of 0.1% by mole, is sent to wash column L to wash the condensates. The other part of the condensate wash water from wash column L (36 kmol/h) is sent to the top of stripping section S2.

The composition of the exported liquid (line 27), expressed in percent by mole, is as follows:

| | |
|---|---|
| Ethane | 2.0% |
| Propane | 54.5% |
| Butanes | 27.2% |
| $C_5^+$ hydrocarbons | 16.2% |
| Methanol | <1000 ppm |
| Water | <1000 ppm. |

The composition of the exported gas (line 19), expressed in percent by volume, is as follows:

| | |
|---|---|
| $CO_2$ | 1.74% |
| Methane | 87.40% |
| Ethane | 10.73% |
| Propane | 0.13% |
| Methanol | 4 ppm |
| Water | 6 ppm. |

What is claimed is:

1. A process for dehydrating and fractionating a wet natural gas containing constituents referred to as <<heavy>> constituents and constituents referred to as <<light>> constituents, in the presence of methanol, said process comprising in combination at least the following stages:
  (a) a first part of the gas to be scrubbed is contacted with aqueous liquid phase L' comprising aqueous liquid phases L'1 and L'2 containing methanol and coming from stages (c) and (g) respectively, the second part of the gas is contacted with a methanol-containing aqueous liquid phase L'3 from condensate washing stage (j), and the two parts of the gas are combined,
  (b) the gas is cooled,
  (c) a gas phase G1, a hydrocarbon liquid phase L1 and a methanol-containing aqueous liquid phase L'1 obtained during stage (b) are separated,
  (d) at least part of gas phase G1 from separation stage (c) is sent to an expansion stage (X1) so as to obtain a mixed phase M2,
  (e) mixed phase M2 is sent to a heat exchange stage (h) wherein it serves as a cooling agent, after which it is heated,
  (f) hydrocarbon liquid phase L1 is sent to an expansion stage (V),
  (g) heated mixed phase M2 and expanded liquid phase L1 are sent to a separation stage so as to obtain a gas phase G2, a hydrocarbon liquid phase L2 and a methanol-containing aqueous liquid phase L'2,
  (h) gas phase G2 is fractionated by distillation carried out by continuous heat exchange with mixed phase M2 and the <<light>> constituents are extracted in form of a gas, which is exported, while the <<heavy>> constituents are extracted as condensates which are added to phase L2, fractionating stage (h) being carried out after expansion stage (d),
  (i) aqueous liquid phases L'1 and L'2 are combined into an aqueous liquid phase L' which is contacted with the first part of the gas to be scrubbed, which carries along the most part of the methanol, which allows practically pure water to be collected, and
  (j) hydrocarbon liquid phase L2 is sent to a washing stage (column L) performed in contact with a methanol-containing aqueous liquid phase obtained from contacting with the second part of the gas to be scrubbed in stage (a);
said process being characterized in that at least a methanol-containing aqueous liquid phase produced in the process is sent to a distillation stage (k) wherein practically pure methanol is collected at the top and a methanol-depleted aqueous liquid phase is collected at the bottom and re-used at another point of the process.

2. A process as claimed in claim 1, characterized in that, before stage (i), all or part of methanol-containing aqueous liquid phase L'1 separated in stage (c) is sent to a distillation stage (k) wherein practically pure methanol is separated at the top and a methanol-depleted aqueous liquid phase L'4 is collected at the bottom.

3. A process as claimed in claim 2, characterized in that said methanol-depleted aqueous liquid phase L'4 is sent back to stage (a).

4. A process as claimed in claim 2, characterized in that said methanol-depleted aqueous liquid phase is used to wash the liquid hydrocarbons in hydrocarbon liquid phase L2 washing stage (j).

5. A process as claimed in claim 1, characterized in that all or part of methanol-containing aqueous liquid phase L'2 from stage (g) is sent to a distillation stage (k) wherein practically pure methanol is separated at the top and a methanol-depleted aqueous liquid phase L'5 is collected at the bottom.

6. A process as claimed in claim 5, characterized in that said methanol-depleted aqueous liquid phase L'5 is sent back to stage (a).

7. A process as claimed in claim 5, characterized in that said methanol-depleted aqueous liquid phase is used to wash the liquid hydrocarbons in hydrocarbon liquid phase L2 washing stage U).

8. A process as claimed in claim 1, characterized in that all or part of the methanol-containing aqueous liquid phase recovered at the bottom of liquid hydrocarbon wash column L is sent to a distillation stage (k) wherein practically pure methanol is separated at the top and a methanol-depleted aqueous liquid phase L'6 is collected at the bottom.

9. A process as claimed in claim 8, characterized in that said methanol-depleted aqueous liquid phase L'6 is recycled to the top of hydrocarbon liquid phase L2 washing stage (j).

10. A process as claimed in claim 1, characterized in that at least part of the scrubbed gas from stage (h) is used to cool the gas during cooling stage (b).

11. A process as claimed in claim 1, characterized in that, in stage (b), the gas is cooled so as to obtain a temperature below −15° C.

12. A process as claimed in claim 1, characterized in that expansion stage (d) is carried out so as to obtain a gas at a pressure below 2 MPa.

13. A process as claimed in claim 1, characterized in that the expanded liquid phase is sent to a stabilization stage so as to obtain stabilized condensates and a gas phase G3 to be fractionated, sent to separation stage (f).

14. A process as claimed in claim 1, characterized in that fractionating stage (h) is carried out in an exchanger-dephlegmator comprising at least two passes, including a reflux pass, wherein fractionation is performed.

15. A process as claimed in claim 1, characterized in that at least part of the scrubbed gas from fractionating stage (h) is used as an additional cooling agent for this stage.

16. A process as claimed in claim 14, characterized in that at least part of the scrubbed gas from fractionating stage (h) is used as an additional cooling agent for this stage, and in that said exchanger-dephlegmator comprises a third pass suited to allow passage of at least part of the extracted gas, for additional cooling.

17. A process as claimed in claim 1, applied to scrubbing and fractionating of a gas essentially comprising methane, ethane, hydrocarbons with at least three carbon atoms and water.

* * * * *